United States Patent [19]

Hoppe et al.

[11] 3,900,361

[45] Aug. 19, 1975

[54] HOT FUSION COATING MASSES

[75] Inventors: Gerhard Hoppe, Marl-Sinsen; Heinrich Leppek, Gelsenkirchen-Buer; Leo Rensmann; Helmut Kehr, both of Dorsten, all of Germany

[73] Assignee: Veba-Chemie AG, Gelsenkirchen-Buer, Germany

[22] Filed: July 2, 1973

[21] Appl. No.: 376,044

Related U.S. Application Data

[62] Division of Ser. No. 194,023, Oct. 29, 1971, abandoned.

[30] Foreign Application Priority Data

Oct. 30, 1970 Germany.......................... 2053365

[52] U.S. Cl................ 156/334; 161/247; 260/27 R; 260/28.5 A; 260/93.7; 260/876 R; 260/878 R; 260/897 A

[51] Int. Cl........................... C09j 5/00; B32b 27/32

[58] Field of Search...................... 156/334; 161/247; 260/27 R, 28.5 A, 41 B, 41 R, 93.7, 875, 876 R, 878 R, 897 A

[56] References Cited

UNITED STATES PATENTS

| | | | |
|---|---|---|---|
| 2,572,458 | 10/1951 | Eustis | 260/897 A X |
| 3,145,111 | 8/1964 | Norton | 260/28.5 R X |
| 3,519,511 | 7/1970 | Coover | 156/234 |
| 3,642,678 | 2/1972 | Shepherd et al. | 260/28.5 A |
| 3,678,023 | 7/1972 | Frese | 260/93.7 |

*Primary Examiner*—Charles E. Van Horn
*Assistant Examiner*—Robert A. Dawson
*Attorney, Agent, or Firm*—Burgess, Dinklage & Sprung

[57] ABSTRACT

A fusion coating mass with increased flexibility to the fusion coating mass which comprises atactic polymers of butene-1.

7 Claims, No Drawings

HOT FUSION COATING MASSES

BACKGROUND OF THE INVENTION

This is a division of application Ser. No. 194,023, filed Oct. 29, 1971, now abandoned.

FIELD OF THE INVENTION

This invention is directed to obtaining improved fusion systems comprising atactic homo- or copolymers of butene-1 alone or in combination with materials such as resins, natural or synthetic, waxes, plasticizers, fillers, atactic polypropylene, isotactic polyolefins and the like wherein the fusion system is characterized by superior low temperature properties. This invention is also directed to providing such a fusion system which, at equivalent temperatures, has superior flexibility properties and, as such, is useful in areas for which prior art fusion systems have had no applicability.

The development of fusion systems for coatings of all types, agglutinations, etc. has in the past years made a very rapid progress. This is due above all to their technical advantages such as freedom from solvents, rapid adhesion and fixing capacity, which make costly drying and gelating channels superfluous. Fusion systems are for instance used today as fusion bonding materials, fusion agglutinants, fusion coating masses, hot sealing agents, fusion adhesion bonding agents for the treatment of paper, wrapping materials, films, textiles and various others.

A plurality of raw materials from the group of the elastomers, resins, waxes, etc., is used today alone or in combination in fusion masses. It is also known to use atactic polypropylene alone or in combination as raw material in fusion masses. For instance, fusion systems comprising a resin, wax or plasticiser and atactic polypropylene have been developed for use as adhesion bonding agents, backing such as carpet backings, waxes, coating masses and the like. The atactic polypropylene employed is either entirely or predominantly amorphous and has a melt viscosity of less than 300,000 centipoise determined at 170°C. In some cases, however, a product of a viscosity of greater than 300,000 centipoise/170°C is also of interest. A commercially available atactic polypropylene has generally a breaking point according to Fraass of −10°C to −15°C.

Fusion systems utilizing atactic polypropylene suffer from the distinct disadvantage of poor resistance to cold as filled masses comprising atactic polypropylene become brittle, especially at low temperatures, with increasing filler content. Such is decidedly disadvantageous as numerous end uses necessitate good low temperature properties. As carpet backing coatings require a substantial degree of filler content, these atactic polypropylene containing fusion systems have been of limited utility. Hence, it has become desirable to provide a system for fusion coating which can tolerate low temperatures with retaining flexibility. It is also desirable to provide a fusion system which has good flexibility at high filler content. Moreover, it is desirable to provide a fusion coating system characterized by good flexibility useful as a coating for the backs of carpets having a solids content in excess of 60 percent by weight.

SUMMARY OF THE INVENTION

Broadly, this invention contemplates a fusion coating mass comprising atactic homo- or copolymers of butene-1 component to impart increased flexibility to the fusion coating mass.

DESCRIPTION OF PREFERRED EMBODIMENTS

It has now been found that the disadvantages attendant prior art masses especially those based on atactic polypropylene can be avoided by utilizing atactic polybutene-1 in place of the polypropylene. The term "polybutene-1" as utilized herein contemplates polybutene-1, as such, or copolymerized with a monomer other than butene-1. Thus, copolymers of polybutene-1 are contemplated, especially copolymers of polybutene-1 with other alpha olefins. The extent of such copolymerization can vary over a wide range, i.e., 1–99% by weight.

Fusion contact masses of the present invention which contain polybutene-1 can, together with such polybutene-1, contain other polyolefins, especially polymers of alpha olefins. Thus, the polybutene-1 can be present in the contact mass together with significant amounts of polypropylene. Alternatively, the butene-1 and propylene can be copolymerized and, as such, used in the fusion contact mass. Preferably, the polyolefin used in conjunction with the atactic polybutene-1 is an atactic polyolefin. If the polyolefin is of isotactic nature, it may be present in an amount up to 30% by weight.

The atactic polybutene-1 component is in intimate combination in the fusion contact mass with at least one adhesion bonding materials. By the term "adhesion bonding material" is meant those agents normally utilized in fusion systems for coatings, agglutinations and the like. Such term encompasses both natural and synthetic resins, natural and synthetic waxes, plasticisers, fillers and elastomers which can be in admixture with other agents such as stabilizers.

The resinous type agents contemplated are crystalline or amorphous organic solids or semisolids. Many of such materials have a characteristic luster and are transparent or translucent. Natural resins can be of vegetable origin occurring as exudates from pine or fir trees, either alone or as fluid mixtures with terpentine or other essential art. Derivatives of these resins are also contemplated such as natural resin esters known as colophonium ester or ester gum. A useful synthetic resin is e.g. petroleum-resin.

The waxes utilized can be natural or synthetic. If synthetic, they are generally a low molecular weight polyolefin polymer having a wax-like consistency.

Fillers which can be used in combination with the polybutene-1 include inorganic and organic fillers especially solids. These solids include substances such as heavy spar, an inorganic solid. Other materials include siliceous fillers containing amounts of salts and oxides of other metals especially manganese, aluminum, sodium, potassium, iron and the like. Vinyl polymers can also be added. Such vinyl polymers can be used as such as in the form of a copolymer especially with an alpha olefin, particularly ethylene.

One object of the invention is, therefore, to provide a fusion coating mass containing atactic polybutene-1 and/or atactic copolymers of butene-1 with other α-olefins alone or in mixture with other atactic polyolefins and the usual additives.

The polymers used in accordance with the invention can have a breaking point according to Fraass of −20°C to −25°C. They are more like elastomers than atactic polypropylene and have a breaking elongation of up to 400% as compared to ≤ 100% of the commercially available atactic polypropylene. The adhesion of the polymer determined in the angular peeling test according to DIN 53 282 against V₂A sheet metal is in the same order of magnitude as that of atactic polypropylene. Thus, the polymers utilized according to the invention yield coatings having the same adhesiveness as atactic polypropylene, but a higher flexibility.

In order to more fully illustrate the invention and the manner of practicing the same, the following examples are presented:

EXAMPLE 1

A coating mass of the following composition is suitable as adhesion bonding agent:
- 50 parts by weight of atactic polybutene-1 (viscosity: 10,000 centipoise/170°C)
- 35 parts by weight of colophonium ester (ester gum)
- 15 parts by weight of polyisobutylene (molecular weight: 1,000)
- 0.2 parts by weight of di-tert.-butyl-p-cresol
- 30 parts by weight of barium sulfate This adhesion bonding agent retains its adhesiveness and flexibility even at low temperatures. Contrary to a bonding agent containing atactic polypropylene it can be peeled off smooth surfaces (glass) without leaving any residue. It is suitable for the treatment of paper, textiles, in particular carpet tiles, plastic films.

EXAMPLE 2

A coating mass for a high-gloss coating consists of:
- 10 parts by weight of atactic polybutene-1 (viscosity: 40,000 centipoise/170°C)
- 90 parts by weight of hard paraffin (melting point: 62°C)
- 0.1 part by weight of di-tert.-butyl-p-cresol This mass has a viscosity of 20 centipoise/120°C.

EXAMPLES 3 TO 5

The examples 3 to 5 illustrate the superiority of highly filled hot fusion masses on the basis of the polymers and polymer mixtures according to the invention.

The reverse side of so-called self-laying carpet tiles is treated with a heavy coating in the hot fusion process. The coating has to be flexible enough not to break or crack upon bending the tile. The pin bending test is suitable to test the flexibility. For this purpose, films of 2 mm thickness made of the coating mass are bent around a pin, and the pin diameter at which the film cracks or breaks, is stated. A conventional coating mass consists of 30 parts of atactic polypropylene and 70 parts of heavy spar. This mass breaks at a pin diameter of 8 mm.

Other customary additives are stabilizers, waxes, resins, and in given cases, isotactic polypropylene, isotactic polybutene-1, or combinations thereof to increase the hardness.

EXAMPLE 3

A carpet coating mass consists of:
- 30 parts by weight of a mixture of 50% atactic polypropylene (viscosity 7,000 centipoise/170°C) and 50% atactic polybutene-1 (viscosity 20,000 centipoise/170°C)
- 70 parts by weight of heavy spar
- 0.2 parts by weight of Topanol$^R$ CA
- 0.2 parts by weight of dilaurylthiodipropionate A 2 mm film of this mass does not break or crack when bent around a 2 mm pin.

EXAMPLE 4

A carpet coating mass consists of:
- 30 parts by weight of atactic polybutene-1 (viscosity: 20,000 centipoise/170°C)
- 70 parts by weight of heavy spar
- 0.2 parts by weight of Topanol$^R$ CA
- 0.2 parts by weight of dilaurylthiodipropionate This mass exhibits the same flexibility as the mass of example 3.

EXAMPLE 5

A carpet coating mass consists of:
- 30 parts by weight of an atactic copolymer of 30% butene-1 and 70% propene (viscosity: 40,000 cP/170°C)
- 70 parts by weight of heavy spar
- 0.2 parts by weight of Topanol$^R$ CA
- 0.2 parts by weight of dilaurylthiodipropionate This mass exhibits the same flexibility as the masses of examples 3 and 4.

If the polymers of butene-1 are not used alone, but in combination with other materials they will be present in an amount of 10 – 95% by weight.

V₂A is a stainless steel and contains 18% Cr, 9% Ni, 0,12% C in the maximum, and the rest is Fe.

The given examples show the composition of the coating masses. The preparation of the coating mass is effected by mixing the components in a Banbury-mixer or by using a stirring equipment at temperatures above the boiling point of the organic component of the mixture. Topanol$^R$ CA is 1,1,3 Tris-(2methyl-4-hydroxy-5-tert. butylphenyl)butane.

Preferred plastisers are polyisobutylene of liquide or semisolide consistance with a molecular weight of 1,000 – 10,000, polybutene oils with a molecular weight of 600 – 3,000, esters of adipic acid or sebacinic acid and so on.

Preferred fillers are heavy spar, cristalline and amorphous chalk, talk, asbest, clays and so on.

The coating masses are generally applied by means of a curtain-coater (films, papers and textiles), by casting means or by means of a doctors' knife. Especially a high-viscous filled mass for the backing of a carpet is applied by means of a doctors' knife. Application may also be by rolling.

We claim:

1. In a process for adhering two substances together wherein to one substance there is applied an adhesive at an elevated temperature which when it cools adheres thereto and the substance containing said adhesive is applied to a second substance which abuts the adhesive on the first substance and is heat fused thereto, improvement wherein said adhesive is a fusion coating mass consisting essentially of an atactic homo or copolymer of butene-1 said fusion coating mass containing at least 60% by weight solids.

2. A process according to claim 1 wherein the fusion coating mass contains a salt of manganese, a salt of aluminum, a salt of sodium, a salt of potassium, a salt of iron, an oxide of manganese, an oxide of aluminum, an oxide of sodium, an oxide of potassium, an oxide of iron, up to 30% by weight polyisobutylene, barium sulfate, crystalline chalk, amorphous chalk, heavy spar, talc, asbestos, clay, low molecular weight polyolefin having a wax-like consistency or paraffin.

3. A method according to claim 2 wherein the atactic polymer of butene-1 is in the form of a copolymer.

4. A method according to claim 3 wherein the copolymer is a copolymer of butene-1 and an alpha-polyolefin.

5. A method according to claim 3 wherein the copolymer is a copolymer of butene-1 and propylene.

6. A process according to claim 1 wherein the fusion coating mass contains an agent selected from the group consisting of di-tert.-butyl-p-cresol, dilaurylthiodipropionate and 1,1,3-tris-(2-methyl-4-hydroxy-5-tert.-butylphenyl) butane.

7. A process according to claim 1 wherein the fusion coating mass contains colophorium ester.

* * * * *